(12) United States Patent
Schneider et al.

(10) Patent No.: US 9,154,510 B2
(45) Date of Patent: Oct. 6, 2015

(54) METHODS, APPARATUSES, AND RELATED COMPUTER PROGRAM PRODUCT FOR NETWORK SECURITY

(75) Inventors: Peter Schneider, Holzkirchen (DE); Guenther Horn, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/377,239

(22) PCT Filed: Jun. 10, 2009

(86) PCT No.: PCT/EP2009/057203
§ 371 (c)(1),
(2), (4) Date: Dec. 9, 2011

(87) PCT Pub. No.: WO2010/142331
PCT Pub. Date: Dec. 16, 2010

(65) Prior Publication Data
US 2012/0084451 A1  Apr. 5, 2012

(51) Int. Cl.
  *G06F 15/16* (2006.01)
  *H04L 29/06* (2006.01)
(52) U.S. Cl.
  CPC .............. *H04L 63/105* (2013.01); *H04L 63/20* (2013.01)
(58) Field of Classification Search
  CPC . H04L 63/104; H04L 63/306; H04L 65/1016; H04L 9/0802; H04L 2209/56; H04L 2209/80; H04L 63/0853; H04L 63/10; H04L 63/102; H04L 63/107; H04L 63/12; H04L 63/164; H04L 9/14
  USPC ........................................ 709/229; 726/1–36
  See application file for complete search history.

(56) References Cited

U.S. PATENT DOCUMENTS 7,995,994 B2 *  8/2011  Khetawat et al. ............. 455/410
2009/0220091 A1 *  9/2009  Howard ......................... 380/277
(Continued)

FOREIGN PATENT DOCUMENTS

| GB | 2 411 554 A | 8/2005 |
|----|-------------|--------|
| WO | WO 01/08377 A2 | 2/2001 |
| WO | WO 2009/068985 A2 | 6/2009 |

OTHER PUBLICATIONS

3GPP TR 33.828 V1.3.0 (May 2009, Technical Report, 3rd Generation Partnership Project; Technical Specification Group Services and System Aspects; IMS media plane security (Release 8) (69 pages).
(Continued)

*Primary Examiner* — Douglas W Owens
*Assistant Examiner* — Monica C King
(74) *Attorney, Agent, or Firm* — Harrington & Smith (57) ABSTRACT

It is disclosed a method (and related apparatus) including selecting, at a first endpoint entity, at least one range of protection to be granted, the range of protection relating to one of a plurality of network elements in at least one access network and at least one core network and to a second endpoint entity, and transmitting, to a network element entity, a signaling message including first establishment information indicating the at least one range of protection to be granted; and a method (and related apparatus) including receiving, at the network element entity, the signaling message from the first endpoint entity, obtaining, from a second endpoint entity and based on the first establishment information, second establishment information indicating protection granted by the second endpoint entity, and signaling, from the network element entity to the first endpoint entity, third establishment information indicating the protection granted to the first endpoint entity.

52 Claims, 4 Drawing Sheets (56) References Cited

U.S. PATENT DOCUMENTS

2010/0154047 A1* 6/2010 Roach et al. .............. 726/9
2011/0010768 A1* 1/2011 Barriga et al. ............. 726/11

OTHER PUBLICATIONS

3GPP TS 23.228 V9.0.0 (Jun. 2009)Technical Specification, 3rd Generation Partnership Project; Technical Specification Group Services and System Aspects; IP Multimedia Subsystem (IMS); Stage 2 (Release 9) (250 pages).
MMUSIC Working Group, "SDP Capability Negotiation", draft-ietf-mmusic-sdp-capability-negotiation-09.txt, F. Andreasen, Cisco Systems, Jul. 11, 2008, (80 pages).
MMUSIC, "Analysis of Middlebox Interactions for Signaling Protocol Communication along the Media Path", draft-ietf-mmusic-media-path-middleboxes-02.txt, B. Stucker, H. Tschofenig, Nokia Siemens Networks, Mar. 9, 2009, (21 pages).
IETF RFC3261 Standard Track "SIP: Session Initiation Protocol", (Jun. 2002), (269 pages).
RFC:3830 MIKEY: Multimedia Internet KEYing , (Aug. 2004), (66 pages).
RFC: 3711 The Secure Real-time Transport Protocol (SRTP), (Mar. 2004), (66 pages).
RFC 3550 RTP: A Transport Protocol for Real-Time Applications , (Jul. 2003), (104 pages).
Network Working Group, RFC4301, "Security Architecture for the Internet Protocol", S. Kent, K. Seo, BBN Technologies , (Dec. 2005), (101 pages).
Network Working Group, RFC4302, "IP Authentication Header", S. Kent, BBN Technologies, (Dec. 2005), (34 pages).
Network Working Group, RFC4304, "Extended Sequence No. (ESN) Addendum to IPsec Domain of Interpretation (DOI) for Internet Security Association and Key Management Protocol (ISAKMP)", S. Kent, BBN Technologies, (Dec. 2005), (5 pages).
Network Working Group, RFC4346, "The Transport Layer Security (TLS)Protocol Version 1.1", T. Dierks, Independent, E. Rescorla, RTFM, Inc., Apr. 2006 , (87 pages).
Network Working Group, RFC4566, "SDP: Session Description Protocol", M. Handley, UCL, V. Jacobson, Packet Design, C. Perkins, University of Glasgow, Jul. 2006 , (49 pages).
Network Working Group, RFC4568, "Session Description Protocol (SDP) Security Descriptions for Media Streams", F. Andreasen, M. Baugher, D. Wing, Cisco Systems, Jul. 2006, (44 pages).
Network Working Group, RFC5246, "The Transport Layer Security (TLS) Protocol Version 1.2", T. Dierks, Independent, E. Rescorla, RTFM, Inc., Aug. 2008 , (104 pages).

* cited by examiner

METHODS, APPARATUSES, AND RELATED COMPUTER PROGRAM PRODUCT FOR NETWORK SECURITY

FIELD OF THE INVENTION

Examples of the present invention relate to network security. More specifically, the examples of the present invention relate to methods, apparatuses, and a related computer program product for network security. The examples of the present invention may be applicable to network security e.g. based on a session initiation/description protocol (SIP/SDP) or $3^{rd}$ generation partnership project (3GPP) internet protocol (IP) multimedia subsystem (IMS).

BACKGROUND

In traditional time division multiplex (TDM) networks, voice may be transmitted mostly "in cleartext", i.e. without any cryptographic protection like encryption, as traditional TDM networks were considered to be secure enough for the needs of the vast majority of users.

If voice or, more generally, multimedia communication is transmitted over packet networks, e.g. IP based networks like the Internet, the security aspect may differ: It is considered much more likely that communication may be eavesdropped, e.g. at WLAN hotspots, or by a person or entity having gained control over any infrastructure component in a media path, e.g. a router or switch within an IP based network.

So, it may be considered to apply cryptographic protection to media communication over packet networks. From a user perspective, the protection should be end-to-end (e2e), i.e. the cryptographic protocol should run between the communicating endpoints, with no network element in-between accessing the cleartext of the communication.

In many cases however, there may be a need for access to the cleartext, e.g. in case of transcoding of the media e.g. in order to transport media over specific network sections. Subscribers may trust their multimedia service provider (SP) to perform such necessary operations. In that case, the SP may require knowledge e.g. of cryptographic parameters such as keys used for encryption and/or integrity protection. Therefore, key management protocols may be used that perform the key exchange by usage of signaling message elements such that the encryption keys are visible to the network elements (NWEs) in the network that process the signaling messages (called "signaling relays" in the following). Examples of such key exchange protocols used for multimedia security over IP networks are SDP security descriptions (SDES) or MIKEY-NULL that can be used to establish keys for a secure real time transport protocol (SRTP) which may be designed for securing multimedia communication based on the real time transport protocol (RTP).

When using such protocols, signaling may be protected during transport between endpoints and signaling relays or between signaling relays against eavesdropping by third parties. Such protection of the signaling messages can be performed by running e.g. a cryptographic protocol between each pair of entities that exchange signaling messages. For example, if SIP is used for signaling, the cryptographic protocol may be IP secure (IPsec) encapsulating security payload (ESP) or transport layer security (TLS).

Another reason why e2e security for the multimedia communication may not be possible is that it cannot be expected that all end user equipment acting as communication endpoint will support the respective mechanisms. In fact, devices used for such multimedia communication may not be capable of supporting the above mechanisms.

In particular, the connection between an end user and a multimedia core network over a so called "access network" may be exposed to attacks (e.g. if WLAN or wire-line shared media techniques are used in the access network). So, it may be reasonable to secure the multimedia communication at least over the access network, providing what is called end-to-middle (e2m) security in the following.

In consideration of the above, according to examples of the present invention, methods, apparatuses and a related computer program product for network security are provided.

In this connection, the examples of the present invention enable one or more of the following:

Establishing optimum media security range of protection (e2e being better than e2m being better than no security) for a media stream in an efficient way: user A of a multimedia communication service wants to apply media security to a multimedia session he is going to establish with another user B. Media security mechanisms are supported by the endpoint used by A. A's service provider generally supports media security mechanisms and, for each individual media stream, may or may not be willing and able to terminate media security within the multimedia core network. User A does not know whether user B's endpoint is able to support media security. User A wants to set up e2e security in case user B's endpoint supports this and to set up e2m security otherwise. User A may even be willing to perform unsecured communication, if A's service provider should be unable to provide e2m security for a particular multimedia stream. Moreover, when the session is established, A may have information on what type of security is provided: e2e, e2m or none at all;

Distinguishing between e2e and e2m security;

No requirement for an enhancement of the registration procedure (e.g. SIP REGISTER message)

Making use of all media security variants, e.g. end-to-middle (e2m) security, by endpoints being capable of media security but not being capable of the enhanced registration procedure;

Ensuring optimal security, i.e. e2m security only if e2e security is impossible, or no security only if e2m security is impossible: when an endpoint A requests the setup of a secured media stream, there may be no way for the network serving endpoint A (i.e. the network of A's multimedia service provider) to find out what the media security capabilities of the other endpoint are. This could e.g. be the case, if the other endpoint is served by another network;

Enabling an endpoint to request for different ranges of protection;

Establishing e2e security whenever supported;

Establishing, in case e2e security is not supported, e2m security if it is supported, and only in the worst case, no security is established at all;

Establishing security even in cases where signaling/media relay (SMR) A cannot support security termination/ origination (which may be a temporary condition, e.g. overload with respect to crypto-processing), by not declining requests to set up "e2m security at least" in this case but rather trying to establish e2e security (only if this fails, the media stream set up fails altogether);

Providing an endpoint that requested the establishment of a media stream with an indication on the protection range that is provided for this media stream;

Enabling an efficient mechanism, as only a few or no additional signaling elements are required and no additional exchanges of signaling messages is introduced;

Enabling an efficient and robust mechanism, as no support by relays other than SMRA is required (Legacy relays not being able to process the indicated protection range can ignore it and pass it on unchanged. Even if the remote endpoint does not support the mechanism, still the best possible protection range will be established);

Independency of the procedure for establishing optimum security from how and whether the achieved protection range is indicated to the endpoint;

BRIEF DESCRIPTION OF THE DRAWINGS

The examples of the present invention are described herein below with reference to the accompanying drawings, in which.

DETAILED DESCRIPTION OF THE EXAMPLES OF THE PRESENT INVENTION

The examples of the present invention are described herein below by way of example with reference to the accompanying drawings.

It is to be noted that for this description, the terms "media streams; best effort security, at least end-to-middle security, only end-to-middle security, and/or end-to-end security; at least capable of end-to-middle security; secured data stream between the first and second endpoints; secured datastream between the first endpoint and the network element entity and an unsecured datastream between the network element entity and the other endpoint; unsecured data stream between the first and second endpoints; signaling and media relay entity; extension to a session initiation/description protocol." are examples for "data streams; types of range of protection; types of the protection capabilities; end-to-end security; end-to-middle security; no security; network element entity; first, second and/or third code type", respectively, without restricting the latter-named terms to the special technical or implementation details imposed to the first-named terms.

A so-called "probing" may be employed, e.g. requesting e2e security in a first trial to establish a media stream, and in case this fails, making a second trial requesting e1m security, and possibly even making a third trial, establishing the media stream without security.

Figure 1:
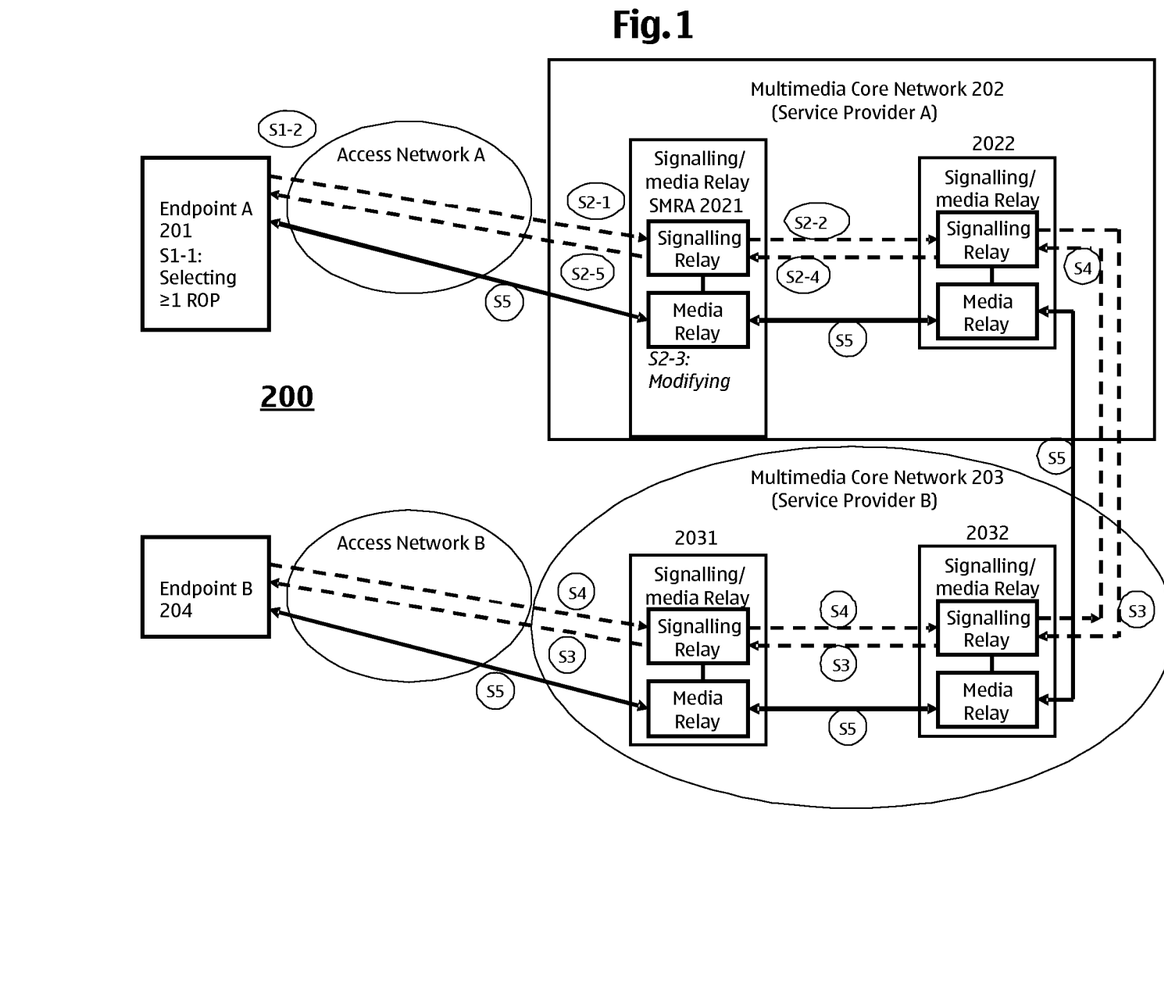
FIG. 1 shows an example network where methods for network security according to examples of the present invention can be applied.
Figure 2:
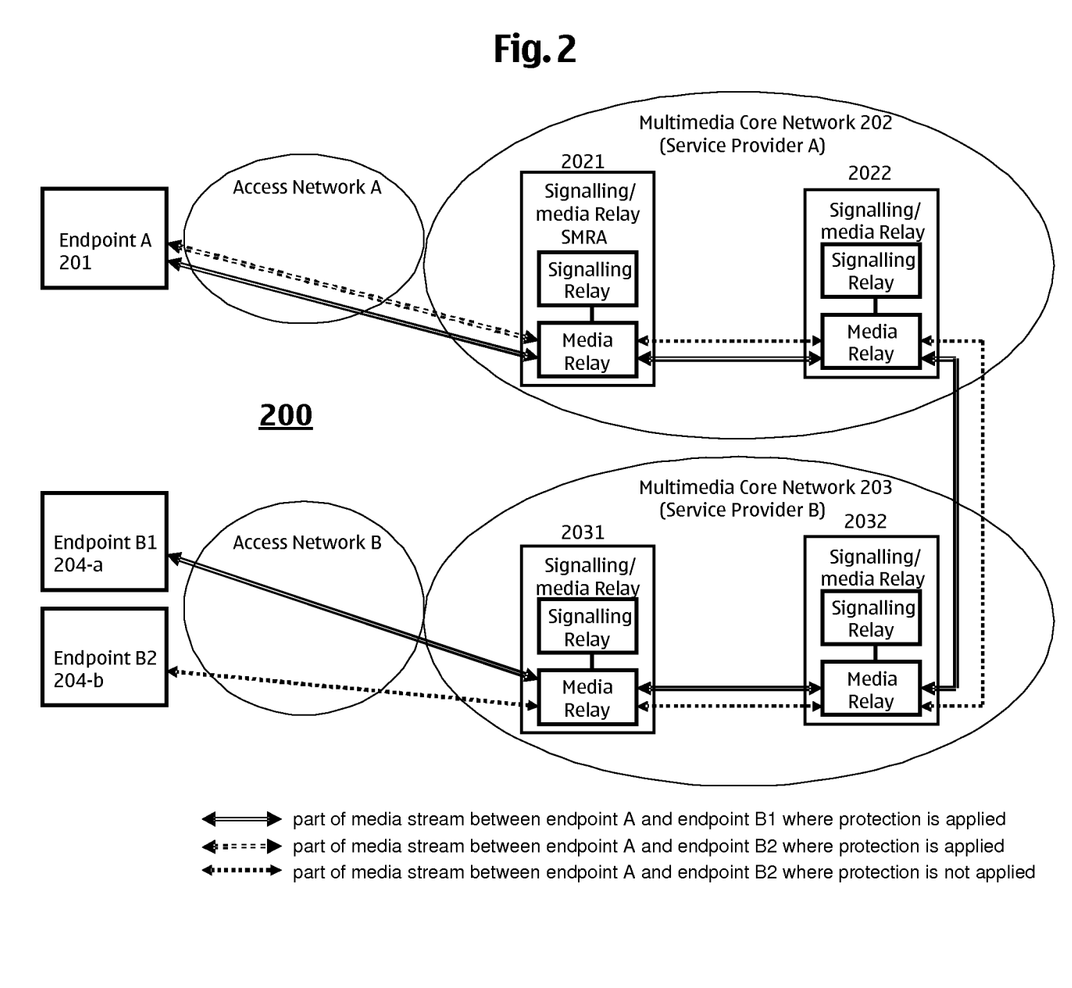
FIG. 2 shows a detail of the methods for network security according to the examples of the present invention.

FIGS. 1 and 2 show the methods for network security according to the examples of the present invention.

As shown in FIGS. 1 and 2, a communication system 200 may comprise a first endpoint A 201, a first multimedia core network 202, a second multimedia core network 203 and a second endpoint B 204. In turn, the multimedia core networks 202 and 203 may each comprise at least one signaling/media relay 2021, 2022, 2031, 2032. Each signaling/media relay 2021, 2022, 2031, 2032 may comprise a signaling relay and a media relay.

As shown in FIGS. 1 and 2, if security cannot function in an e2e fashion, it would still be beneficial to secure the communication at least over a part of the communication path where the security mechanisms are supported.

So, it should be considered to secure the multimedia communication at least over the access network, providing what is called end-to-middle (e2m) security in the following. Providing e2m security may comprise a media stream being relayed over a network element capable of terminating security (in the direction from the endpoint which uses security) and originating security (in the direction towards the endpoint which uses security). A media relay that terminates/originates security may be controlled by the signaling relay instructing the media relay to forward data streams and terminate or originate security for data streams. The signaling relay also may provide security parameters to the media relay, e.g. the keys. As mentioned above, the signaling relay and corresponding media relay together are referred to as "signaling/media relay" 2021, 2022, 2031, 2032 in the following.

FIG. 1 shows a scenario realizing communication between the two endpoints A 201 and B 204 involving two access networks A and B and the two interconnected multimedia core networks 202, 203, e.g. operated by two different service providers A and B. Signaling and media traffic between the endpoints 201, 204 passes several signaling and media relays 2021, 2022, 2031, 2032, respectively. Each media relay may be controlled by the signaling relay.

The dotted arrows labeled S1-2, S2-1, S2-2, and S3 show the passing of e.g. a signaling message requesting the establishment of a media stream from endpoint A via the four signaling relays to endpoint B 204.

The dotted arrows labeled S4, S2-4 and S2-5 show the passing of e.g. an answer signaling message from endpoint B 204 via the four signaling relays to endpoint A 201. The signaling relays may modify certain parts of a signaling message before they pass it on towards the next destination. The purpose of such modifications may be to ensure that the subsequent answer signaling message is routed again via this signaling relay (which might otherwise not necessarily be the case) or to make sure that the subsequent media stream is routed via the media relay controlled by the signaling relay.

The arrows labeled S5 show the media stream that is relayed between endpoints A 201 and B 201 by the four media relays.

FIG. 1 shows two core networks 202, 203 and two access networks. However, there could also be a single core network, and endpoints A 201 and B 204 could use a single access network to this core network. There could also be one or more additional core networks be involved, acting as transit core networks between the core networks shown in the figure. Note that there can also be signaling relays that do not control a media relay. The number of involved signaling/media relays can vary. There may be at least one signaling/media relay that serves as the entry point for signaling traffic and media traffic of endpoint A 201 into the core network 202. For endpoint A 201 in FIGS. 1 and 2, this is the signaling/media relay SMRA 2021.

In the example shown in FIG. 2, it is assumed that endpoints A 201 and B1 204-a as well as signaling/media relay SMR A 2021 support media security mechanisms. Endpoint B2 204-b may not support media security mechanisms. All signaling/media relays 2021, 2022, 2031, 2032 may support transport of signaling elements, including those needed for signaling secured media streams. All media relays may support transport of cleartext or encrypted media. Endpoint A 201 may have a multimedia session with endpoint B1 204-a, where the media stream may be secured in an e2e fashion. Endpoint A 201 may have another session, with endpoint B2

204-*b*, where the media stream may be secured in an e1m fashion between endpoint A 201 and SMR A 2021.

Note that in this example, protecting the media communication between endpoint A 201 and endpoint B2 **204-*b*** only over the access network A may have relevance although the rest of the communication may be unprotected. For example, the two core networks may be considered secure in the sense that mechanisms such as physical protection make it unlikely that communication can be eavesdropped there. Access network B on the other hand might use its own, access network specific security mechanism, e.g. it could be a 3GPP mobile network applying the encryption mechanisms specified by 3GPP for such networks.

Figure 4:
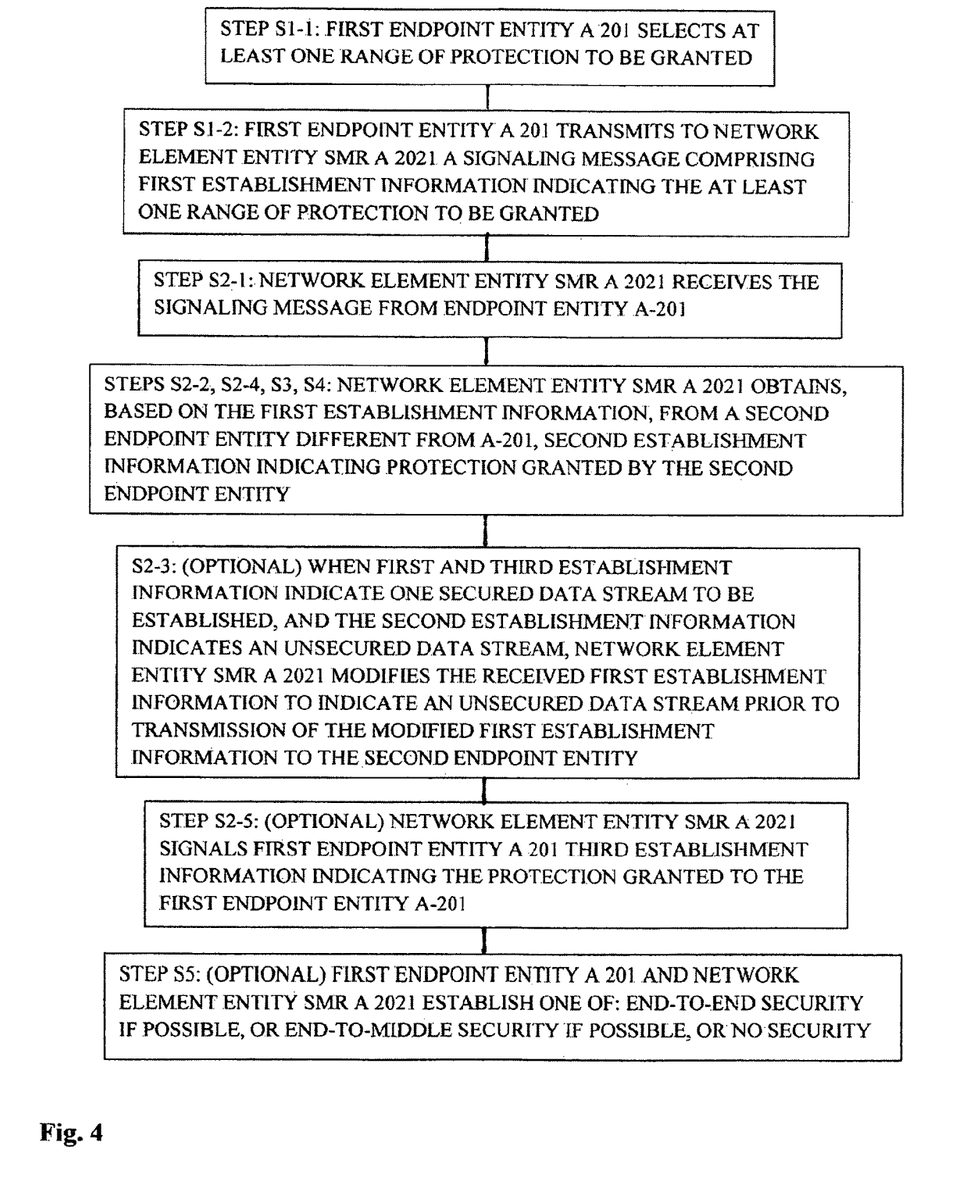
FIG. 4 shows a flow diagram descriptive of FIG. 2.

First, and referring also to FIG. 4, in step S1-1, e.g. endpoint A 201 may perform selecting, at a first endpoint entity (e.g. endpoint A 201 itself), at least one range of protection to be granted, the range of protection relating to a plurality of network elements in at least one access network and at least one core network, or to a second endpoint entity.

Then, in step S1-2, e.g. endpoint A 201 may perform transmitting, to a network element entity (e.g. SMR A 2021), a signaling message comprising first establishment information indicating the at least one range of protection to be granted. In step S2-1, e.g. SMR A 2021 may perform receiving, at the network element entity (e.g. SMR A 2021 itself), the signaling message from the first endpoint entity, the signaling message comprising the first establishment information indicating the at least one range of protection to be granted.

Then, in steps S2-2 and S2-4 (and further in steps S3 and S4), e.g. SMR A 2021 may perform obtaining, at the network element entity (e.g. SMR A 2021 itself), from the second endpoint entity different from the first endpoint entity and based on the first establishment information, second establishment information indicating protection granted by the second endpoint entity.

Further, in an optional step S2-5, e.g. SMR A 2021 may perform signaling, from the network element entity (e.g. SMR A 2021) to the first endpoint entity (e.g. endpoint A 201), third establishment information indicating the protection granted to the first endpoint entity.

As for further developments of the methods pertaining to endpoint A 201 and SMR A 2021, the first, second and third establishment information may respectively relate to a data stream to be established. Further, the first information may comprise an explicit information element for indicating a desired type of the range of protection.

Moreover, the second or third establishment information may comprise an explicit information element for indicating the granted protection. Alternatively, the first, second or third establishment information may comprise an explicit information element for indicating the protection capabilities of the first endpoint entity, second endpoint entity or a network element entity respectively. Alternatively, no explicit information element indicating the range of protection may be contained in the first establishment information.

Further, in an optional step S5, e.g. endpoint A 201 and SMR A 2021 may perform establishing end-to-end security if possible, else end-to-middle security if possible, else no security.

In addition to the above, the first establishment information may indicate one secured data stream to be established and one unsecured data stream to be established, and the second and third establishment information may indicate the secured data stream and/or the unsecured data stream. In that case, the secured data stream and the unsecured data stream may have to be established as parallel data streams according to the indication in the first establishment information. Further, the signaling may be repeated with the first establishment information indicating only the secured data stream. In that case, the signaling may be repeated in case the second endpoint has signaled grant of both the secured and the unsecured data stream.

As an alternative to the above, the secured data stream and the unsecured data stream may be signaled to be established as alternative data streams.

Alternatively, the first and third establishment information may indicate one secured data stream to be established, and the second establishment information may indicate an unsecured data stream. In that case, in an optional step S2-3, e.g. SMR A 2021 may perform modifying, upon receiving the first establishment information comprising an indication of the range of protection, the first establishment information to indicate an unsecured data stream, wherein the modifying may be performed prior to a transmission of the modified first establishment information to the second endpoint entity. In that case, the range of protection comprised in the first establishment information may be end-to-middle-only.

Alternatively, the first establishment information may indicate one secured data stream to be established, the second and third establishment information may indicate failure, and wherein after signaling of the third establishment information, the receiving may comprise a repeated receiving of the first establishment information with a range of protection to be granted different from the range of protection to be granted which was used when having received the first establishment earlier. In that case, the range of protection comprised in the repeated first establishment information may be end-to-middle-only. Further, the third establishment information may comprise capability information.

In addition to the above, if the transmitting and the signaling are based on a session initiation/description protocol, the establishment information messages may be headed by a first code type indicating the requested type of data stream. In that case, the first code type may be followed by a second code type indicating the type of range of protection. In that case, the second code type may be followed by a third code type indicating the protection capabilities.

In addition to the above, the transmitting, receiving and signaling may be performed dynamically.

For example, for each media stream to be established by the endpoint 201, the endpoint 201 can signal to the network the "protection range" either by using an explicit signaling element within the signaling message used to establish the media stream, or in an implicit way, as described herein below. Up to three or more different protection ranges "best effort security" (PR_BE), "e2m security at least" (PR_e2m_at_least), and "e2e security mandatory" (PR_e2e) may be supported, i.e. they can be signaled (explicitly or implicitly) by the endpoints 201 or 204, and the network may establish security accordingly.

Figure 3:
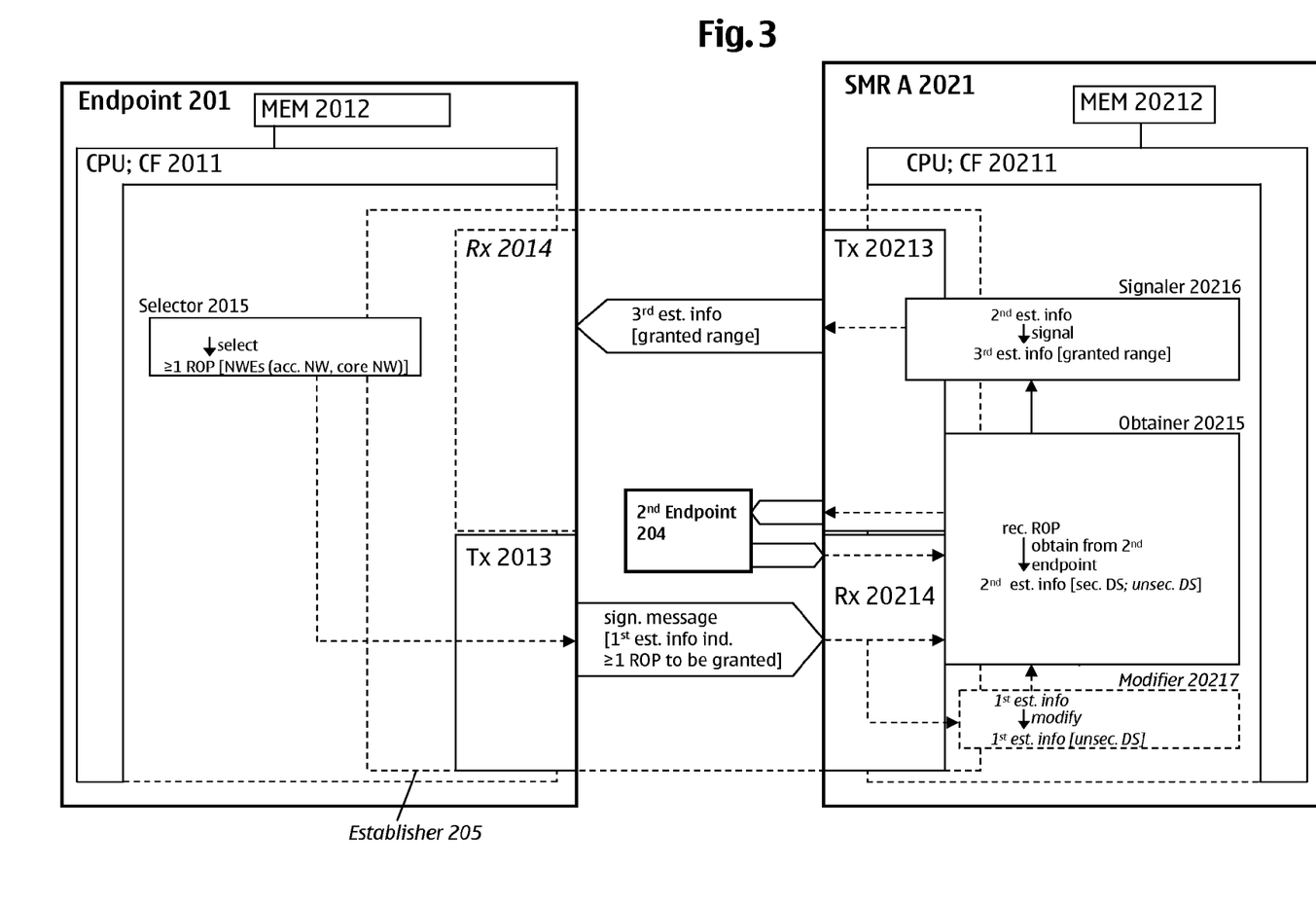
FIG. 3 shows apparatuses for network security according to the examples of the present invention.

FIG. 3 shows apparatuses (e.g. endpoint 201 and SMR 2021) for network security according to the examples of the present invention. Within FIG. 3, for ease of description, means or portions which may provide main functionalities are depicted with solid functional blocks or arrows and/or a normal font, while means or portions which may provide optional functions are depicted with dashed functional blocks or arrows and/or an italic font.

The endpoint 201 may comprise a CPU (or core functionality CF) 2011, a memory 2012, a transmitter (or means for transmitting) 2013, an optional receiver (or means for receiving) 2014 and a selector (or means for selecting) 2015. Further, the endpoint 205 may comprise elements (not shown) identical or similar to those of endpoint 201.

And, the SMR 2021 may comprise a CPU (or core functionality CF) 20211, a memory 20212, a transmitter (or means for transmitting) 20213, a receiver (or means for receiving) 20214, an obtainer (or means for obtaining) 20215, a signaler (or means for signaling) 20216 and an optional modifier (or means for modifying) 20217.

As indicated by the dashed extensions of the functional blocks of the CPU 2011 or 20221, the means for selecting 20215 of the endpoint 201 as well as the means for obtaining 20215, means for signaling 20216 and the means for modifying 20217 of the SMR 2021 may be functionalities running on the CPU 2011 or 20221 of the endpoint 201 or SMR 2021, or may alternatively be separate functional entities or means.

The CPUs $20x1$ (wherein x=1 and 21) may respectively be configured, for example by software residing in the memory $20x2$, to process various data inputs and to control the functions of the memories $20x2$, the means for transmitting $202x3$ and the means for receiving $20x4$ (and the means for selecting 20215 of the endpoint 201 as well as the means for obtaining 20215, means for signaling 20216 and the means for modifying 20217 of the SMR 2021). Further, it is to be noted that the CPUs $20x1$, the means for transmitting $20x3$ and the means for receiving $20x4$ may constitute means for establishing 205 in the sense of the examples of the present invention. The memories $20x2$ may serve e.g. for storing code means for carrying out e.g. the methods according to the example of the present invention, when run e.g. on the CPUs $20x1$. It is to be noted that the means for transmitting $20x3$ and the means for receiving $20x4$ may alternatively be provided as respective integral transceivers. It is further to be noted that the transmitters/receivers may be implemented i) as physical transmitters/receivers for transceiving e.g. via the air interface (e.g. endpoint 201 and SMR 2021), ii) as routing entities e.g. for transmitting/receiving data packets e.g. in a PS (packet switching) network (e.g. between SMR 2021 and another SMR 2022 when disposed as separate network entities), iii) as functionalities for writing/reading information into/from a given memory area (e.g. in case of shared/common CPUs or memories e.g. between SMR 2021 and another SMR 2022 when disposed as an integral network entity), or iv) as any suitable combination of i) to iii).

First, e.g. the means for selecting 2015 of endpoint A 201 may perform selecting, at a first endpoint entity (e.g. endpoint A 201 itself), at least one range of protection to be granted, the range of protection relating to a plurality of network elements in at least one access network and at least one core network, or to a second endpoint entity.

Then, e.g. the means for transmitting 2013 of endpoint A 201 may perform transmitting, to a network element entity (e.g. SMR A 2021), a signaling message comprising first establishment information indicating the at least one range of protection to be granted. For example, the means for receiving 20214 of SMR A 2021 may perform receiving, at the network element entity (e.g. SMR A 2021 itself), the signaling message from the first endpoint entity, the signaling message comprising the first establishment information indicating the at least one range of protection to be granted.

Then, e.g. the means for obtaining 20215 of SMR A 2021 may perform obtaining, at the network element entity (e.g. SMR A 2021 itself), from the second endpoint entity (e.g. second endpoint 204) different from the first endpoint entity and based on the first establishment information, second establishment information indicating protection granted by the second endpoint entity.

Further, e.g. the means for signaling 20216 of SMR A 2021 may perform signaling, from the network element entity (e.g. SMR A 2021) to the first endpoint entity (e.g. endpoint A 201), third establishment information indicating the protection granted to the first endpoint entity.

As for further developments of endpoint A 201 and SMR A 2021, the first, second and third establishment information may respectively relate to a data stream to be established. Further, the first information may comprise an explicit information element for indicating a desired type of the range of protection.

Moreover, the second or third establishment information may comprise an explicit information element for indicating the granted protection. Alternatively, the first, second or third establishment information may comprise an explicit information element for indicating the protection capabilities of the first endpoint entity, second endpoint entity or a network element entity respectively. Alternatively, no explicit information element indicating the range of protection may be contained in the first establishment information.

Further, e.g. the means for establishing 205 of endpoint A 201 and SMR A 2021 may perform establishing end-to-end security if possible, else end-to-middle security if possible, else no security.

In addition to the above, the first establishment information may indicate one secured data stream to be established and one unsecured data stream to be established, and the second and third establishment information may indicate the secured data stream and/or the unsecured data stream. In that case, the secured data stream and the unsecured data stream may have to be established as parallel data streams according to the indication in the first establishment information. Further, the signaling may be repeated with the first establishment information indicating only the secured data stream. In that case, the signaling may be repeated in case the second endpoint has signaled grant of both the secured and the unsecured data stream.

As an alternative to the above, the secured data stream and the unsecured data stream may be signaled to be established as alternative data streams.

Alternatively, the first and third establishment information may indicate one secured data stream to be established, and the second establishment information may indicate an unsecured data stream. In that case, e.g. the means for modifying 20217 of SMR A 2021 may perform modifying, upon receiving the first establishment information comprising an indication of the range of protection, the first establishment information to indicate an unsecured data stream, wherein the modifying may be performed prior to a transmission of the modified first establishment information to the second endpoint entity. In that case, the range of protection comprised in the first establishment information may be end-to-middle-only.

Alternatively, the first establishment information may indicate one secured data stream to be established, the second and third establishment information may indicate failure, and wherein after signaling of the third establishment information, the receiving may comprise a repeated receiving of the first establishment information with a range of protection to be granted different from the range of protection to be granted which was used when having received the first establishment earlier. In that case, the range of protection comprised in the repeated first establishment information may be end-to-middle-only. Further, the third establishment information may comprise capability information.

In addition to the above, if the means for transmitting and the means for signaling are configured to perform based on a session initiation/description protocol, the establishment information messages may be headed by a first code type indicating the requested type of data stream. In that case, the first code type may be followed by a second code type indicating the type of range of protection. In that case, the second code type may be followed by a third code type indicating the protection capabilities.

In addition to the above, the transmitting, receiving and signaling may be performed dynamically.

For example, for each media stream to be established by the endpoint 201, the endpoint 201 can signal to the network the "protection range" either by using an explicit signaling element within the signaling message used to establish the media stream, or in an implicit way, as described herein below. Up to three different protection ranges "best effort security" (PR_BE), "e2m security at least" (PR_e2m_at_least), and "e2e security mandatory" (PR_e2e) may be supported, i.e. they can be signaled (explicitly or implicitly) by the endpoints 201 or 204, and the network may establish security accordingly.

It is to be noted that any of the apparatus and/or method features cited herein below merely constitute optional method/apparatus features.

Support of Different Sets of Protection Ranges

As stated before, it is not necessary that all 3 protection ranges are supported (i.e. can be explicitly or implicitly be signaled, and the network behaves accordingly). So, any combination may be used.

An exemplary subset could e.g. comprise only PR_BE and PR_e2e (i.e. no signaling of "e2m security at least" is possible). In this case, if a data stream is to be established by the endpoint A 201 with at least e2m security, the endpoint A 201 can indicate PR_BE ("best effort security"), and cancel the media stream setup in case no security can be established. Restricting the method to these two options reduces the effort in the SMR A 2021 (only two cases to distinguish).

For example, it is possible to use only one of two explicit protection range indications (e.g. one of "e2e security" and "e2m security only"). In case one protection range indication is used only, its absence in a signaling answer from SMR A 2021 to endpoint A 201 containing the acceptance of a secured stream may indicate that the other protection range (that cannot be signaled explicitly) has been achieved. It is also possible to completely dispense with the signaling of the achieved protection range, since the establishment of optimum security would still work even without the endpoint A 201 not having information how far the achieved security extends.

BE Security

For example, "Best effort security" (PR_BE) may mean that the endpoint 201 prefers e2e security over e2m security over no security. In this case, the endpoint may signal two alternative media streams, one with security (a secured stream) and one without security (an unsecured stream), and may be prepared to establish the unsecured stream in case no security can be provided, and to establish the secured stream in case e2m or e2e security can be provided. The network may try to establish e2e security, if possible, otherwise it may try to establish e2m security, and if this is also not possible, the media stream may be established without security.

In other words, when a media stream is to be established by an endpoint A 201 with "best effort security" with an endpoint B 204, endpoint A 201 may send a signaling message containing two alternative streams (one secured and one unsecured stream) and indicating PR_BE to a signaling/media relay SMR A 2021 in the multimedia core network 202 of A's service provider, where the media relay may be capable of originating and terminating security for media streams. By adding suitable signaling elements to the signaling message, or by suitably changing signaling elements within the signaling message, the SMR A 2021 may ensure that the media stream, once it is established, will be routed via SMR A 2021, and that the answer signaling from the called endpoint B 204 towards A 201 will also be routed via the SMR A 2021. The SMR A 2021 may pass the modified signaling message on towards endpoint B 204. When the signaling message reaches the endpoint B 204, endpoint B 204 may decide which of the data streams it accepts, and may send a respective signaling answer towards endpoint A 201. When this signaling answer reaches SMR A 2021, the SMR A 2021 may inspect the answer. If the answer signals acceptance of the secured stream, SMR A 2021, in its signaling answer to endpoint A 201, may signal acceptance of the secured stream and may indicate "e2e security". If the answer signals acceptance of the unsecured stream only, and the SMR A 2021 is capable to terminate/originate security for this specific media stream, SMR A 2021 may configure its media relay to terminate and originate security from and towards the endpoint A 201, respectively, e.g. to transform the secured media stream from endpoint A 201 into the unsecured stream towards endpoint B 204 and to transform the unsecured media stream from endpoint B 204 into the secured stream towards endpoint A 201. SMR A 2021 may then signal acceptance of the secured stream towards endpoint A 201 and may indicate "elm security only". If the answer from endpoint B 204 signals acceptance of the unsecured stream only, and SMR A 2021 is not capable to terminate/originate security for this specific media stream, SMR A 2021 may signal acceptance of the unsecured stream only to endpoint A 201. No indication about the protection range may be needed in this answer, as endpoint A 201 may realize that no security can be provided from the fact that only the unsecured stream is accepted.

For example, rather than using explicit signaling elements to indicate the requested protection range, this may be indicated implicitly. For example, signaling only a secured media stream may indicate either PR_e2m_at_least or PR_e2e (which of these may be agreed beforehand between the user A and its service provider) and signaling one secured and one unsecured media stream that are otherwise identical may indicate the request of PR_BE.

For example, in SIP/SDP signaling, signaling of two streams in parallel may be interpreted as a request to establish both streams. So, if the endpoint B 204 follows this interpretation, endpoint B 204 has the choice to accept either or both of the streams (the unsecured and the secured stream) that are contained in the signaling message. (The same situation may arise if PR_BE had been signaled using an explicit signaling element, but endpoint B 204 is unaware of the mechanism and does not understand the signaling element, or if one of the relays, unaware of the mechanism, has unexpectedly removed the signaling element indicating PR_BE). If in this situation endpoint B 204 decides to accept only one of the streams, the mechanism works as described above.

To resolve the situation of acceptance of both data streams, there may be two options:

1. Either the means for signaling 20216 of SMR A 2021 may repeat the signaling towards endpoint B 204, this time signaling only the secured stream. B's answer on this second signaling may signal acceptance of the secured stream, and SMR A 2021 may pass this to endpoint A 201 e.g. with the indication "e2e security".
2. Or, the means for signaling 20216 of SMR A 2021 may just pass endpoint B's 204 answer indicating acceptance of both streams to endpoint A 201, leaving it to endpoint A 201 to repeat the signaling with only the secured stream, or to do anything else A may want to do.

By using one of these two options, e2e security may be achieved.

For example, in an environment where it is possible to signal two alternative media streams (rather than two parallel media streams, as described above), this feature could be used to signal PR_BE, i.e. the secured and the unsecured stream are signaled as alternative streams, without an explicit signaling element indicating PR_BE.

For example, in SIP/SDP signaling, there may be a way to signal both a secured and an unsecured stream. An endpoint aware of the mechanism may realize that two different, alternative streams are indicated and may accept only one of them. An endpoint not aware of the mechanism may only realize one of the alternative streams and ignore any alternative streams. SMR A 2021, when receiving the answer, may act as described above for BE security. That is, if endpoint B 204 has accepted the secured stream, e2e security is achieved; in case endpoint B 204 has accepted the unsecured stream only, e2m security is achieved.

For example, in case PR_e2m_at_least is signaled by endpoint A 201 explicitly or implicitly, the means for converting 20216 of the SMR A 2021 may convert this signaling into signaling of PR_BE as described herein below and may use one of the two techniques described above (signaling parallel streams or signaling alternative streams) to signal PR_BE implicitly.

E2M Security

"e2m security at least" (PR_e2m_at_least) may mean that the endpoint 201 may prefer e2e security over e2m security and does not accept no security. In this case, the means for transmitting 2013 of the endpoint A 201 may signal a secured stream only. The network may try to establish e2e security, if possible, otherwise it may try to establish e2m security. The stream establishment may intentionally fail if no security can be provided.

For example, when a media stream is to be established by endpoint A 201 with "e2m security at least" with an endpoint B 204, the means for transmitting 2013 of endpoint A 201 may send a signaling message containing a secured stream (but no alternative unsecured stream) and indicating PR_e2m_at_least to the signaling/media relay SMR A 2021 in the multimedia core network 202 of endpoint A's service provider, where the media relay is capable of originating and terminating security for media streams. The means for signaling 20216 of SMR A 2021 may then signal the secured stream as well as an unsecured stream (with the same characteristics otherwise) towards the endpoint B 204 and may indicates PR_BE. From this point, the procedure may function like BE security described above, with the only difference that if the means for receiving 20214 of SMR A 2021 receives acceptance of the unsecured stream only and is itself not capable to terminate/originate security for this specific media stream, the means for signaling 20216 of SMR A 2021 may not be able to signal acceptance of the unsecured stream towards endpoint A 201, as endpoint A 201 has not signaled this stream in its original request. So, SMR A 2021 may reject the secured stream in its answer to endpoint A 201 and the establishment of a media stream may fail.

The mechanism described above focuses on signaling originating from endpoint A 201. It may be enhanced by support of e2m security in case endpoint A 201 is the terminating point of an unsecure media stream signaled by some other endpoint B 204. In this case, SMR A 2021, being the last signaling/media relay before the traffic is passed to endpoint A 201, when receiving a signaling message by which endpoint B 204 requests the establishment of an unsecured media stream, may add an alternative, secured media stream to the signaling message and may indicate "e2m security only" in the signaling message. In case endpoint A 201 accepts the unsecured stream, this has no further effect. In case endpoint A 201 accepts the added secured stream, SMR A 2021 may transform the subsequent media stream between secured (towards endpoint A 201) and unsecured (towards endpoint B 204) as described for BE security above.

E2E Security

"e2e security mandatory" (PR_e2e) may mean that the endpoint A 201 accepts only e2e security. The endpoint A 201 may signal a secured stream only. The network may try to establish e2e security, and the stream establishment may intentionally fail if e2e security cannot be provided.

When a media stream is to be established by the endpoint A 201 only if e2e security is supported, the endpoint A 201 may transmit a signaling message containing a secured stream (but no alternative unsecured stream) and indicating PR_e2e to the signaling/media relay SMR A 2021 in the multimedia core network 202 of A's service provider. SMR A 2021 may pass this message on towards the endpoint B 204, which may either accept or reject the secured stream. When this signaling answer reaches SMR A 2021, SMR A 2021 may pass it on to endpoint A 201 and may indicate "e2e security".

Moreover, for each secure media stream that is established, the network can signal to the endpoint A 201 that has requested the establishment of the stream either "e2e security" or "e2m security only", where the latter means that security may be terminated e.g. in the core network 202 of the endpoint's service provider, and the former means that this may not be the case (and is therefore truly e2e as long as no other networks which are passed by the media stream terminate the security without indicating it). There may e.g. be a gateway to a traditional telephone network, which may terminate media security without necessarily indicating this. Note that an explicit indication of "no security" is not needed, because an endpoint may get this information from the fact that a secured stream is not accepted.

Variants in Signaling of the Achieved Protection Range

For example, A's service provider (e.g. in core network 202) may decide to replace the indication "e2e security" it would send to endpoint A 201 according to the mechanism by a new indication "e2m security at least" in all cases where the media stream traverses core networks of other service providers. With this modification, an indication of "e2e security" may mean that the media stream is secured on each hop between endpoint and media relay or between media relays. The indication of "e2m security at least" may mean that the media stream is protected over the access network between endpoint A 201 and the core network 202 of A's service provider and all through A's service provider's core network and may also be protected on the rest of the communication path.

Application of the Mechanism to SIP/SDP

The mechanism described above is applicable to IP networks e.g. with SIP/SDP signaling, where the signaling relays may be SIP proxies or SIP back-to-back user agents. The media relays may be IP-IP-gateways which may—apart from possibly terminating/originating media security—perform tasks like NAT traversal, far end NAT support, policy control or other border control functions. An instance of a signaling/media relay may be a so called session border controller applicable e.g. to voice over IP (VoIP) networks.

For example, in SIP/SDP, media streams may be described by so called "m-lines", followed by attributes.

E.g. an m-line describing an audio stream could have the format:
m=audio 12345 RTP/SAVP . . .
a=crypto . . . .

Here, the transmitter of this session description indicates it is prepared to receive an audio stream using SRTP, where the crypto parameters (in particular the key) are specified in an attribute labeled "crypto".

In this context, protection ranges PR_BE, PR_e2m_at_least, and PR_e2e may be signaled by adding a line
a=req_prot_range:best effort,
a=req_prot_range:e2m at least
and
a=req_prot_range:e2e_mandatory,
respectively.

In an answer from SMR A 2021 to endpoint A 201, SMR A 2021 could indicate the achieved protection range by adding a line:
a=prot_range:e2e,
a=prot_range:e2m at least,
or
a=prot_range:e2m only.

In this context, implicit signaling of PR_BE by specifying two alternative streams (as described above) could be done using a capability negotiation method. The difference would be a different behavior of SMR A 2021, which would transform between the secured and the unsecured media stream in case the endpoint B accepts the unsecure stream, thus achieving e1m security, where the capability negotiation method would result in no security at all.

Application of the Mechanism to the 3GPP IMS

The SIP/SDP signaling and transport of media over RTP or SRTP is also part of the IP Multimedia Subsystem (IMS). The methods described above may also be applied to IMS. In this case, SMR A 2021 may be a proxy call session control function (P-CSCF) as the signaling relay plus the IMS access gateway as the media relay.

Furthermore, at least one of, or more of the above-described means for receiving 20214, means for obtaining 20215, means for signaling 20216, means for selecting 2015, means for transmitting 2013, 20213, means for establishing 205, means for modifying 20217 as well as the endpoint 201 and the SMR 2021, or the respective functionalities carried out, may be implemented as a chipset, module or subassembly.

Further, the examples of the present invention may also relate to a computer program product comprising code means for performing a method according to the above examples of the present invention when run on a processing means or module.

Finally, the examples of the present invention also relate to a system which may comprise the endpoint 201 and the SMR 2021 according to the above-described examples of the present invention.

FURTHER EXAMPLES

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

According to an example of the present invention, in a first aspect, this object is for example achieved by a method comprising:

receiving, at a network element entity, a signaling message from a first endpoint entity, the signaling message comprising first establishment information indicating at least one range of protection to be granted, the range of protection relating to one of a plurality of network elements in at least one access network and at least one core network and to a second endpoint entity;

obtaining, at a network element entity, from a second endpoint entity different from the first endpoint entity and based on the first establishment information, second establishment information indicating protection granted by the second endpoint entity; and signaling, from the network element entity to the first endpoint entity, third establishment information indicating the protection granted to the first endpoint entity.

According to an example of the present invention, in a second aspect, this object is for example achieved by a method comprising:

selecting, at a first endpoint entity, at least one range of protection to be granted, the range of protection relating to one of a plurality of network elements in at least one access network and at least one core network and to a second endpoint entity; and transmitting, to a network element entity, a signaling message comprising first establishment information indicating the at least one range of protection to be granted.

According to further refinements of the example of the present invention as defined under the above first and second aspects, the first, second and third establishment information respectively relate to a data stream to be established;

the first information comprises an explicit information element for indicating a desired type of the range of protection;

one of the second and third establishment information comprises an explicit information element for indicating the granted protection;

one of the first, second and third establishment information comprises an explicit information element for indicating the protection capabilities of one of the first endpoint entity, second endpoint entity and a network element entity respectively;

no explicit information element indicating the range of protection is contained in the first establishment information;

end-to-end security is established if possible, else end-to-middle security if possible, else no security;

the first establishment information indicates one secured data stream to be established and one unsecured data stream to be established, and the second and third establishment information indicates at least one of the secured data stream and the unsecured data stream;

the secured data stream and the unsecured data stream are to be established as parallel data streams according to the indication in the first establishment information;

the signaling is repeated with the first establishment information indicating only the secured data stream;

the signaling is repeated in case the second endpoint has signaled grant of both the secured and the unsecured data stream;

the secured data stream and the unsecured data stream are signaled to be established as alternative data streams;

the first and third establishment information indicate one secured data stream to be established, and the second establishment information indicates an unsecured data stream;

the method further comprises, in the first network element entity and upon receiving the first establishment information comprising an indication of the range of protection, modifying the first establishment information to indicate an unsecured data stream, wherein the modifying is performed prior to a transmission of the modified first establishment information to the second endpoint entity;

the range of protection comprised in the first establishment information is end-to-middle-only;

the first establishment information indicates one secured data stream to be established, the second and third establishment information indicate failure, and wherein after signaling of the third establishment information, the receiving comprises a repeated receiving of the first establishment information with a range of protection to be granted different from the range of protection to be granted which was used when having received the first establishment earlier;

the range of protection comprised in the repeated first establishment information is end-to-middle-only;

the third establishment information comprises capability information;

if the transmitting and the signaling are based on a session initiation/description protocol, the establishment information messages are headed by a first code type indicating the requested type of data stream;

the first code type is followed by a second code type indicating the type of range of protection;

the second code type is followed by a third code type indicating the protection capabilities;

the transmitting, receiving and signaling are performed dynamically;

the data streams are constituted by media streams;

the types of range of protection comprise at least one of best effort security, at least end-to-middle security, only end-to-middle security, and end-to-end security;

the types of the protection capabilities comprise at least capable of end-to-middle security;

the end-to-end security comprises a secured data stream between the first and second endpoints;

the end-to-middle security comprises a secured datastream between the first endpoint and the network element entity and an unsecured datastream between the network element entity and the other endpoint;

no security comprises an unsecured data stream between the first and second endpoints;

the network element entity is constituted by a signaling and media relay entity;

at least one of the first, second and third code types is an extension to a session initiation/description protocol.

According to an example of the present invention, in a third aspect, this object is for example achieved by an apparatus comprising:

means for receiving, at a network element entity, a signaling message from a first endpoint entity, the signaling message comprising first establishment information indicating at least one range of protection to be granted, the range of protection relating to one of a plurality of network elements in at least one access network and at least one core network and to a second endpoint entity;

means for obtaining, at a network element entity, from a second endpoint entity different from the first endpoint entity and based on the first establishment information, second establishment information indicating protection granted by the second endpoint entity; and means for signaling, from the network element entity to the first endpoint entity, third establishment information indicating the protection granted to the first endpoint entity.

According to an example of the present invention, in a fourth aspect, this object is for example achieved by an apparatus comprising:

means for selecting, at a first endpoint entity, at least one range of protection to be granted, the range of protection relating to one of a plurality of network elements in at least one access network and at least one core network and to a second endpoint entity; and means for transmitting, to a network element entity, a signaling message comprising first establishment information indicating the at least one range of protection to be granted.

According to further refinements of the example of the present invention as defined under the above third and fourth aspects, the first, second and third establishment information respectively relate to a data stream to be established;

the first information comprises an explicit information element for indicating a desired type of the range of protection;

one of the second and third establishment information comprises an explicit information element for indicating the granted protection;

one of the first, second and third establishment information comprises an explicit information element for indicating the protection capabilities of one of the first endpoint entity, second endpoint entity and a network element entity respectively;

no explicit information element indicating the range of protection is contained in the first establishment information;

end-to-end security is configured to be established if possible, else end-to-middle security if possible, else no security;

the first establishment information indicates one secured data stream to be established and one unsecured data stream to be established, and the second and third establishment information indicates at least one of the secured data stream and the unsecured data stream;

the secured data stream and the unsecured data stream are configured to be established as parallel data streams according to the indication in the first establishment information;

the means for signaling is configured to repeat signaling with the first establishment information indicating only the secured data stream;

the means for signaling is configured to repeat signaling in case the second endpoint has signaled grant of both the secured and the unsecured data stream;

the secured data stream and the unsecured data stream are configured to be signaled to be established as alternative data streams;

the first and third establishment information indicate one secured data stream to be established, and the second establishment information indicates an unsecured data stream;

the apparatus further comprises means for modifying, in the first network element entity and upon receiving the first establishment information comprising an indication of the range of protection, the first establishment information to indicate an unsecured data stream, wherein the modifying is performed prior to a transmission of the modified first establishment information to the second endpoint entity by the means for transmitting;

the range of protection comprised in the first establishment information is end-to-middle-only;

the first establishment information indicates one secured data stream to be established, the second and third establishment information indicate failure, and wherein, after the signaling of the third establishment information performed by the means for signaling, the means for receiving is configured to repeat receiving of the first establishment information with a range of protection to be granted different from the range of protection to be granted which was used when having received the first establishment earlier;

the range of protection comprised in the repeated first establishment information is end-to-middle-only;

the third establishment information comprises capability information;

the access network comprises one of session initiation protocol proxy entities and session initiation protocol back-to-back user agents and the core network comprises internet protocol-internet protocol gateways;

the internet protocol-internet protocol gateways are constituted by session border controllers;

if the means for transmitting and the means for signaling are configured to perform based on a session initiation/description protocol, the establishment information messages are headed by a first code type indicating the requested type of data stream;

the first code type is followed by a second code type indicating the type of range of protection;

the second code type is followed by a third code type indicating the protection capabilities;

the core network comprises a signaling media relay which is configured to origin and terminate any security type for data streams;

the means for transmitting, means for receiving and means for signaling are configured to perform dynamically;

the data streams are constituted by media streams;

the types of range of protection comprise at least one of best effort security, at least end-to-middle security, only end-to-middle security, and end-to-end security;

the types of the protection capabilities comprise at least capable of end-to-middle security;

the end-to-end security comprises a secured data stream between the first and second endpoints;

the end-to-middle security comprises a secured datastream between the first endpoint and the network element entity and an unsecured datastream between the network element entity and the other endpoint;

no security comprises an unsecured data stream between the first and second endpoints;

the network element entity is constituted by a signaling and media relay entity;

at least one of the first, second and third code types is an extension to a session initiation/description protocol;

at least one, or more of means for receiving, means for obtaining, means for signaling, means for selecting, means for transmitting, means for establishing, means for modifying and the apparatus is implemented as a chipset, module or subassembly.

According to an example of the present invention, in a fifth aspect, this object is for example achieved by an apparatus comprising:

a receiver configured to receive, at a network element entity, a signaling message from a first endpoint entity, the signaling message comprising first establishment information indicating at least one range of protection to be granted, the range of protection relating to one of a plurality of network elements in at least one access network and at least one core network and to a second endpoint entity;

an obtainer configured to obtain, at a network element entity, from a second endpoint entity different from the first endpoint entity and based on the first establishment information, second establishment information indicating protection granted by the second endpoint entity; and a signaler configured to signal, from the network element entity to the first endpoint entity, third establishment information indicating the protection granted to the first endpoint entity.

According to an example of the present invention, in a sixth aspect, this object is for example achieved by an apparatus comprising:

a selector configured to select, at a first endpoint entity, at least one range of protection to be granted, the range of protection relating to one of a plurality of network elements in at least one access network and at least one core network and to a second endpoint entity; and a transmitter configured to transmit, to a network element entity, a signaling message comprising first establishment information indicating the at least one range of protection to be granted.

According to further refinements of the example of the present invention as defined under the above fifth and sixth aspects, the first, second and third establishment information respectively relate to a data stream to be established;
the first information comprises an explicit information element for indicating a desired type of the range of protection;
one of the second and third establishment information comprises an explicit information element for indicating the granted protection;
one of the first, second and third establishment information comprises an explicit information element for indicating the protection capabilities of one of the first endpoint entity, second endpoint entity and a network element entity respectively;
no explicit information element indicating the range of protection is contained in the first establishment information;
end-to-end security is configured to be established if possible, else end-to-middle security if possible, else no security;
the first establishment information indicates one secured data stream to be established and one unsecured data stream to be established, and the second and third establishment information indicates at least one of the secured data stream and the unsecured data stream;
the secured data stream and the unsecured data stream are configured to be established as parallel data streams according to the indication in the first establishment information;
the signaler is configured to repeat signaling with the first establishment information indicating only the secured data stream;
the signaler is configured to repeat signaling in case the second endpoint has signaled grant of both the secured and the unsecured data stream;
the secured data stream and the unsecured data stream are configured to be signaled to be established as alternative data streams;
the first and third establishment information indicate one secured data stream to be established, and the second establishment information indicates an unsecured data stream;
the apparatus further comprises a modifier configured to modify, in the first network element entity and upon receiving the first establishment information comprising an indication of the range of protection, the first establishment information to indicate an unsecured data stream, wherein the modifying is performed prior to a transmission of the modified first establishment information to the second endpoint entity by the transmitter;
the range of protection comprised in the first establishment information is end-to-middle-only;
the first establishment information indicates one secured data stream to be established, the second and third establishment information indicate failure, and wherein, after the signaling of the third establishment information performed by the means for signaling, the receiver is configured to repeat receiving of the first establishment information with a range of protection to be granted different from the range of protection to be granted which was used when having received the first establishment earlier;
the range of protection comprised in the repeated first establishment information is end-to-middle-only;
the third establishment information comprises capability information;
the access network comprises one of session initiation protocol proxy entities and session initiation protocol back-to-back user agents and the core network comprises internet protocol-internet protocol gateways;
the internet protocol-internet protocol gateways are constituted by session border controllers;
if the transmitter and the signaler are configured to perform based on a session initiation/description protocol, the establishment information messages are headed by a first code type indicating the requested type of data stream;
the first code type is followed by a second code type indicating the type of range of protection;
the second code type is followed by a third code type indicating the protection capabilities;
the core network comprises a signaling media relay which is configured to origin and terminate any security type for data streams;
the transmitter, the receiver and the signaler are configured to perform dynamically;
the data streams are constituted by media streams;
the types of range of protection comprise at least one of best effort security, at least end-to-middle security, only end-to-middle security, and end-to-end security;
the types of the protection capabilities comprise at least capable of end-to-middle security;
the end-to-end security comprises a secured data stream between the first and second endpoints;
the end-to-middle security comprises a secured datastream between the first endpoint and the network element entity and an unsecured datastream between the network element entity and the other endpoint;

no security comprises an unsecured data stream between the first and second endpoints;

the network element entity is constituted by a signaling and media relay entity;

at least one of the first, second and third code types is an extension to a session initiation/description protocol;

at least one, or more of the transmitter, obtainer, signaler, selector, establisher, modifier and the apparatus is implemented as a chipset, module or subassembly.

According to an example of the present invention, in a seventh aspect, this object is for example achieved by a computer program product comprising code means for performing a method according to the above first and second aspects.

According to an example of the present invention, in an eighth aspect, this object is for example achieved by a computer program comprising code means for executing, when run on a computer:

receiving, at a network element entity, a signaling message from a first endpoint entity, the signaling message comprising first establishment information indicating at least one range of protection to be granted, the range of protection relating to one of a plurality of network elements in at least one access network and at least one core network and to a second endpoint entity;

obtaining, at a network element entity, from a second endpoint entity different from the first endpoint entity and based on the first establishment information, second establishment information indicating protection granted by the second endpoint entity; and signaling, from the network element entity to the first endpoint entity, third establishment information indicating the protection granted to the first endpoint entity.

According to an example of the present invention, in a ninth aspect, this object is for example achieved by a computer program comprising code means for executing, when run on a computer:

selecting, at a first endpoint entity, at least one range of protection to be granted, the range of protection relating to one of a plurality of network elements in at least one access network and at least one core network and to a second endpoint entity; and transmitting, to a network element entity, a signaling message comprising first establishment information indicating the at least one range of protection to be granted.

According to an example of the present invention, in a tenth aspect, this object is for example achieved by a system comprising:

an apparatus according to the above third or fifth aspects, and an apparatus according to the above fourth or sixth aspects.

Although the present invention has been described herein before with reference to particular embodiments thereof, the present invention is not limited thereto and various modification can be made thereto.

The invention claimed is:

1. A method, comprising:
receiving, at a network element entity, a signaling message from a first endpoint entity, the signaling message comprising first establishment information indicating a plurality of ranges of protection to be granted, the ranges of protection each specifying the parts of a communication path between the first endpoint entity and a second endpoint entity, being an endpoint entity different from the first endpoint entity, which are to be protected, the ranges of protection relating to at least one of the following:

at least one of a plurality of network elements in at least one access network and at least one core network; and the second endpoint entity;

obtaining, at a network element entity, from the second endpoint entity and derived from the first establishment information, second establishment information indicating a range of protection granted by the second endpoint entity, the range of protection granted by the second endpoint entity being one of the plurality of ranges of protection of the signaling message; and signaling, from the network element entity which obtains the second establishment information from the second endpoint entity, to the first endpoint entity, third establishment information indicating the protection granted to the first endpoint entity.

2. A method, comprising:
selecting, at a first endpoint entity, a plurality of ranges of protection to be granted, the ranges of protection each specifying the parts of a communication path between the first endpoint entity and a second endpoint entity, being an endpoint entity different from the first endpoint entity, which are to be protected, the ranges of protection relating to at least one of the following:

at least one of a plurality of network elements in at least one access network and at least one core network; and the second endpoint entity;

transmitting, to a network element entity, a signaling message comprising first establishment information indicating the plurality of ranges of protection to be granted in order for a network element entity to obtain, from the second endpoint entity and derived from the first establishment information, second establishment information indicating the range of protection granted by the second endpoint entity, the range of protection granted by the second endpoint entity being one of the plurality of ranges of protection of the signaling message; and receiving third establishment information from the network element entity which obtains the second establishment information from the second endpoint entity indicating the protection granted to the first endpoint entity.

3. The method according to claim 1, wherein the first, second and third establishment information respectively relate to a data stream to be established.

4. The method according to claim 1, wherein the first information comprises an explicit information element for indicating a desired type of the range of protection.

5. The method according to claim 1, wherein one of the second and third establishment information comprises an explicit information element for indicating the granted protection.

6. The method according to claim 1, wherein one of the first, second and third establishment information comprises an explicit information element for indicating the protection capabilities of one of the first endpoint entity, second endpoint entity and a network element entity respectively.

7. The method according to claim 1, wherein no explicit information element indicating the range of protection is contained in the first establishment information.

8. The method according to claim 1, wherein end-to-end security is established if possible, else end-to-middle security if possible, else no security.

9. The method according to claim 1, wherein the first establishment information indicates one secured data stream to be established and one unsecured data stream to be established, and the second and third establishment information indicates at least one of the secured data stream and the unsecured data stream.

10. The method according to claim 9, wherein the secured data stream and the unsecured data stream are to be established as parallel data streams according to the indication in the first establishment information.

11. The method according to claim 9, wherein the signaling is repeated with the first establishment information indicating only the secured data stream.

12. The method according to claim 11, wherein the signaling is repeated in case the second endpoint has signaled grant of both the secured and the unsecured data stream.

13. The method according to claim 9, wherein the secured data stream and the unsecured data stream are signaled to be established as alternative data streams.

14. The method according to claim 1, wherein the first and third establishment information indicate one secured data stream to be established, and the second establishment information indicates an unsecured data stream.

15. The method according to claim 14, further comprising, in the first network element entity and upon receiving the first establishment information comprising an indication of the range of protection, modifying the first establishment information to indicate an unsecured data stream, wherein the modifying is performed prior to a transmission of the modified first establishment information to the second endpoint entity.

16. The method according to claim 15, wherein the range of protection comprised in the first establishment information is end-to-middle-only.

17. The method according to claim 1, wherein the first establishment information indicates one secured data stream to be established, the second and third establishment information indicate failure, and wherein after signaling of the third establishment information, the receiving comprises a repeated receiving of the first establishment information with a range of protection to be granted different from the range of protection to be granted which was used when having received the first establishment earlier.

18. The method according to claim 17, wherein the range of protection comprised in the repeated first establishment information is end-to-middle-only.

19. The method according to claim 17, wherein the third establishment information comprises capability information.

20. The method according to claim 3, wherein, if the transmitting and the signaling are based on a session initiation/description protocol, the establishment information messages are headed by a first code type indicating the requested type of data stream.

21. The method according to claim 20, wherein the first code type is followed by a second code type indicating the type of range of protection.

22. The method according to claim 21, wherein the second code type is followed by a third code type indicating the protection capabilities.

23. The method according to claim 1, wherein at least one of the following applies:
   the transmitting, receiving and signaling are performed dynamically;
   the data streams are constituted by media streams;
   the types of range of protection comprise at least one of best effort security, at least end-to-middle security, only end-to-middle security, and end-to-end security;
   the types of the protection capabilities comprise at least capable of end-to-middle security;
   the end-to-end security comprises a secured data stream between the first and second endpoints;
   the end-to-middle security comprises a secured datastream between the first endpoint and the network element entity and an unsecured datastream between the network element entity and the other endpoint;
   no security comprises an unsecured data stream between the first and second endpoints;
   the network element entity is constituted by a signaling and media relay entity;
   at least one of the first, second and third code types is an extension to a session initiation/description protocol.

24. An apparatus, comprising:
a network element entity comprising a processor and a memory including computer program code, where the memory and computer program code are configured with the processor to cause the network element entity at least to receive a signaling message from a first endpoint entity, the signaling message comprising first establishment information indicating a plurality of ranges of protection to be granted, the ranges of protection each specifying the parts of a communication path between the first endpoint entity and a second endpoint entity, being an endpoint entity different from the first endpoint entity, which are to be protected, the ranges of protection relating to at least one of the following:
at least one of a plurality of network elements in at least one access network and at least one core network; and
the second endpoint entity;
where the memory and computer program code are further configured, with the processor, to cause the network element entity to obtain, from a second endpoint entity and derived from the first establishment information, second establishment information indicating a range of protection granted by the second endpoint entity, the range of protection granted by the second endpoint entity being one of the plurality of ranges of protection of the signaling message; and
where the memory and computer program code are further configured, with the processor, to cause the network element entity to signal third establishment information from the network element entity, which obtains the second establishment information from the second endpoint entity, to the first endpoint entity, the third establishment information indicating the protection granted to the first endpoint entity.

25. An apparatus, comprising:
a first endpoint entity comprising a processor and a memory including computer program code, where the memory and computer program code are configured with the processor to cause the first endpoint entity at least to select a plurality of ranges of protection to be granted, the ranges of protection each specifying the parts of a communication path between the first endpoint entity and a second endpoint entity, being an endpoint entity different from the first endpoint entity, which are to be protected, the ranges of protection relating to at least one of the following:
at least one of a plurality of network elements in at least one access network and at least one core network; and
the second endpoint entity; and
where the memory and computer program code are further configured, with the processor, to cause the first endpoint entity to transmit to a network element entity a signaling message comprising first establishment information indicating the plurality of ranges of protection to be granted in order for a network element entity to obtain, from the second endpoint entity and derived from the first establishment information, second establishment information indicating the range of protection granted by the second endpoint entity, the range of protection granted by the second endpoint entity being one of the plurality of ranges of protection of the signaling message; and where the memory and computer program code are further configured, with the processor, to cause the first endpoint entity to receive third establishment information from the network element entity which obtains the second establishment information from the second endpoint entity indicating the protection granted to the first endpoint entity.

26. The apparatus according to claim 24, wherein the first, second and third establishment information respectively relate to a data stream to be established.

27. The apparatus according to claim 24, wherein the first information comprises an explicit information element for indicating a desired type of the range of protection.

28. The apparatus according to claim 24, wherein one of the second and third establishment information comprises an explicit information element for indicating the granted protection.

29. The apparatus according to claim 24, wherein one of the first, second and third establishment information comprises an explicit information element for indicating the protection capabilities of one of the first endpoint entity, second endpoint entity and a network element entity respectively.

30. The apparatus according to claim 24, wherein no explicit information element indicating the range of protection is contained in the first establishment information.

31. The apparatus according to claim 24, wherein end-to-end security is configured to be established if possible, else end-to-middle security if possible, else no security.

32. The apparatus according to claim 24, wherein the first establishment information indicates one secured data stream to be established and one unsecured data stream to be established, and the second and third establishment information indicates at least one of the secured data stream and the unsecured data stream.

33. The apparatus according to claim 32, wherein the secured data stream and the unsecured data stream are configured to be established as parallel data streams according to the indication in the first establishment information.

34. The apparatus according to claim 32, wherein the signaling of the first establishment information is repeated for indicating only the secured data stream.

35. The apparatus according to claim 34, wherein the signaling is repeated in case the second endpoint has signaled grant of both the secured and the unsecured data stream.

36. The apparatus according to claim 32, wherein the secured data stream and the unsecured data stream are configured to be signaled to be established as alternative data streams.

37. The apparatus according to claim 24, wherein the first and third establishment information indicate one secured data stream to be established, and the second establishment information indicates an unsecured data stream.

38. The apparatus according to claim 37, where the memory and computer program code are further configured, with the processor, to cause the network element entity to modify, upon receiving the first establishment information comprising an indication of the range of protection, the first establishment information to indicate an unsecured data stream, wherein the modifying is performed prior to a transmission of the modified first establishment information to the second endpoint entity.

39. The apparatus according to claim 38, wherein the range of protection comprised in the first establishment information is end-to-middle-only.

40. The apparatus according to claim 24, wherein the first establishment information indicates one secured data stream to be established, the second and third establishment information indicate failure, and where the memory and computer program code are further configured, with the processor, to cause the network element entity after the signaling of the third establishment information to repeat receiving of the first establishment information with a range of protection to be granted different from the range of protection to be granted which was used when having received the first establishment information earlier.

41. The apparatus according to claim 40, wherein the range of protection comprised in the repeated first establishment information is end-to-middle-only.

42. The apparatus according to claim 40, wherein the third establishment information comprises capability information.

43. The apparatus according to claim 24, wherein the access network comprises one of session initiation protocol proxy entities and session initiation protocol back-to-back user agents and the core network comprises internet protocol-internet protocol gateways.

44. The apparatus according to claim 43, wherein the internet protocol-internet protocol gateways are constituted by session border controllers.

45. The apparatus according to claim 26, wherein signaling is based on a session initiation/description protocol, and where the establishment information messages are headed by a first code type indicating the requested type of data stream.

46. The apparatus according to claim 45, wherein the first code type is followed by a second code type indicating the type of range of protection.

47. The apparatus according to claim 46, wherein the second code type is followed by a third code type indicating the protection capabilities.

48. The apparatus according to claim 24, wherein the core network comprises a signaling media relay which is configured to originate and terminate any security type for data streams.

49. The apparatus according to claim 24, wherein at least one of the following applies:
receiving and signaling are configured by the memory and computer program, with the processor, to be performed dynamically;
the data streams are constituted by media streams;
the types of range of protection comprise at least one of best effort security, at least end-to-middle security, only end-to-middle security, and end-to-end security;
the types of the protection capabilities comprise at least capable of end-to-middle security;
the end-to-end security comprises a secured data stream between the first and second endpoints;
the end-to-middle security comprises a secured datastream between the first endpoint and the network element entity and an unsecured datastream between the network element entity and the other endpoint;
no security comprises an unsecured data stream between the first and second endpoints;
the network element entity is constituted by a signaling and media relay entity;
at least one of the first, second and third code types is an extension to a session initiation/description protocol.

50. The apparatus according to claim 24, implemented at least in part as a chipset, module or subassembly.

51. A non-transitory computer program product embodied in a non-transitory computer readable medium, the computer program product comprising program code for performing a method according to claim 1 when run on a processor or module.

52. A non-transitory computer program product embodied in a non-transitory computer readable medium, the computer program product comprising program code for performing a method according to claim 2 when run on a processor or module.

* * * * *